United States Patent
Gaither et al.

(10) Patent No.: US 6,826,658 B1
(45) Date of Patent: Nov. 30, 2004

(54) METHOD AND APPARATUS FOR MANAGING AN OPTICAL TRANSCEIVER

(75) Inventors: Justin L. Gaither, Austin, TX (US); Amjad Odet-Allah, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 338 days.

(21) Appl. No.: 10/177,441

(22) Filed: Jun. 20, 2002

(51) Int. Cl.$^7$ .............................................. G06F 13/18
(52) U.S. Cl. ...................................................... 711/150
(58) Field of Search ............................... 711/147, 150; 710/8, 10; 398/106

(56) References Cited

U.S. PATENT DOCUMENTS 6,141,350 A * 10/2000 Mahale et al. ............... 370/438
6,618,392 B1 * 9/2003 Bray ........................... 370/465

* cited by examiner

Primary Examiner—Kevin L. Ellis
(74) Attorney, Agent, or Firm—Timothy W. Markison

(57) ABSTRACT

A method and apparatus for managing an optical transceiver includes processing that begins by transceiving management data with modules external to the optical transceiver. The processing then continues by converting the management data transceived with the external modules between a $1^{st}$ data format (e.g., MDIO interface compatible) and a generic data format (e.g., a format convenient for reading data to and writing data from a random access memory). The processing continues by transceiving management data with modules internal to the optical transceiver. The processing continues by converting the management data transceived with the internal modules between the generic data format and a $2^{nd}$ data format (e.g., I$^2$C). The processing continues by arbitrating access to a shared memory, which stores the management data in the generic format, between requests from internal modules via the second controller and requests from external modules via the first controller.

36 Claims, 6 Drawing Sheets

METHOD AND APPARATUS FOR MANAGING AN OPTICAL TRANSCEIVER

BACKGROUND OF THE INVENTION

1. Technical Field of the Invention

This invention relates generally to communication systems and more particularly to optical transceivers used within such systems.

2. Description of Related Art

Many standards have been created over the years to govern data transmissions within various types of communication systems using various types of data transmission mediums. For example, Ethernet is a standard that prescribes data conveyance protocols for local area networks. Currently, there are a variety of Ethernet standards for various data rates and for various transmission mediums. Such Ethernet standards include 10 BASE-T (10 megabit-per-second (Mbps) data rate over a twisted pair), 10 BASE-F (10 Mbps over a fiber optic cable), 100 BASE-TX (100 Mbps over twisted pairs), 100 BASE-FX (100 Mbps over a fiber optic cable), 1000 BASE-T, or IEEE802.3ab (1 gigabit-per-second (Gbps) over twisted pairs), 1000 BASE-X, or IEEE802.z (1 Gbps over fiber optic cables), and IEEE802.3ae (10 Gbps over twisted pairs).

A new standard, XENPAK, is being developed to establish compatible sources of pluggable fiber optic transceiver modules in support of 10 gigabit-per-second Ethernet (i.e., IEEE802.3ae). The XENPAK standard specifies, among other things, that monitoring of the optical transceiver (i.e., diagnostics, provisioning, status and control) is to be done using a two wire Management Data I/O (MDIO) interface in accordance with the IEEE802.3ae specification.

Traditionally, monitoring optical transceivers (i.e., diagnostics, provisioning, status, and control) has been done using a non-MDIO interface. In many optical transceivers, the management monitoring has been done utilizing an I²C interface. As such, current optical transceivers are not compatible with the MDIO based management monitoring.

Therefore, a need exists for an integrated physical layer module that includes a method and apparatus for bridging MDIO interfaced optical transceiver management with non-MDIO interface optical transceiver management.

BRIEF SUMMARY OF THE INVENTION

The method and apparatus for managing an optical transceiver of the present invention substantially meets these needs and others. Such a method and apparatus includes processing that begins by transceiving management data with modules external to the optical transceiver, which may be done using an MDIO interface. The management data corresponds to managing the transceiving of electrical data by a data path within the optical transceiver. The processing then continues by converting the management data transceived with the external modules between a $1^{st}$ data format (e.g., MDIO interface compatible) and a generic data format (e.g., a format convenient for reading data to and writing data from a random access memory). The processing continues by transceiving management data with modules internal to the optical transceiver. The processing continues by converting the management data transceived with the internal modules between the generic data format and a $2^{nd}$ data format (e.g., I²C). The processing continues by arbitrating access to a shared memory, which stores the management data in the generic format, between requests from internal modules via the second controller and requests from external modules via the first controller.

In another embodiment of a management module within an integrated physical layer of an optical transceiver includes a $1^{st}$ controller, $2^{nd}$ controller, shared memory, and shared memory arbitrator. The $1^{st}$ controller transceives management data with modules external to the optical transceiver and the $2^{nd}$ controller transceives management data with components internal to the optical transceiver. The $1^{st}$ controller converts the management data between a $1^{st}$ data format and a generic data format. The $2^{st}$ controller converts the management data between the generic format and a $2^{nd}$ data format. The shared memory arbitrator arbitrates access between the $1^{st}$ and $2^{nd}$ controllers to store the management data in the generic format within the shared memory.

DETAILED DESCRIPTION OF THE INVENTION

Figure 1:
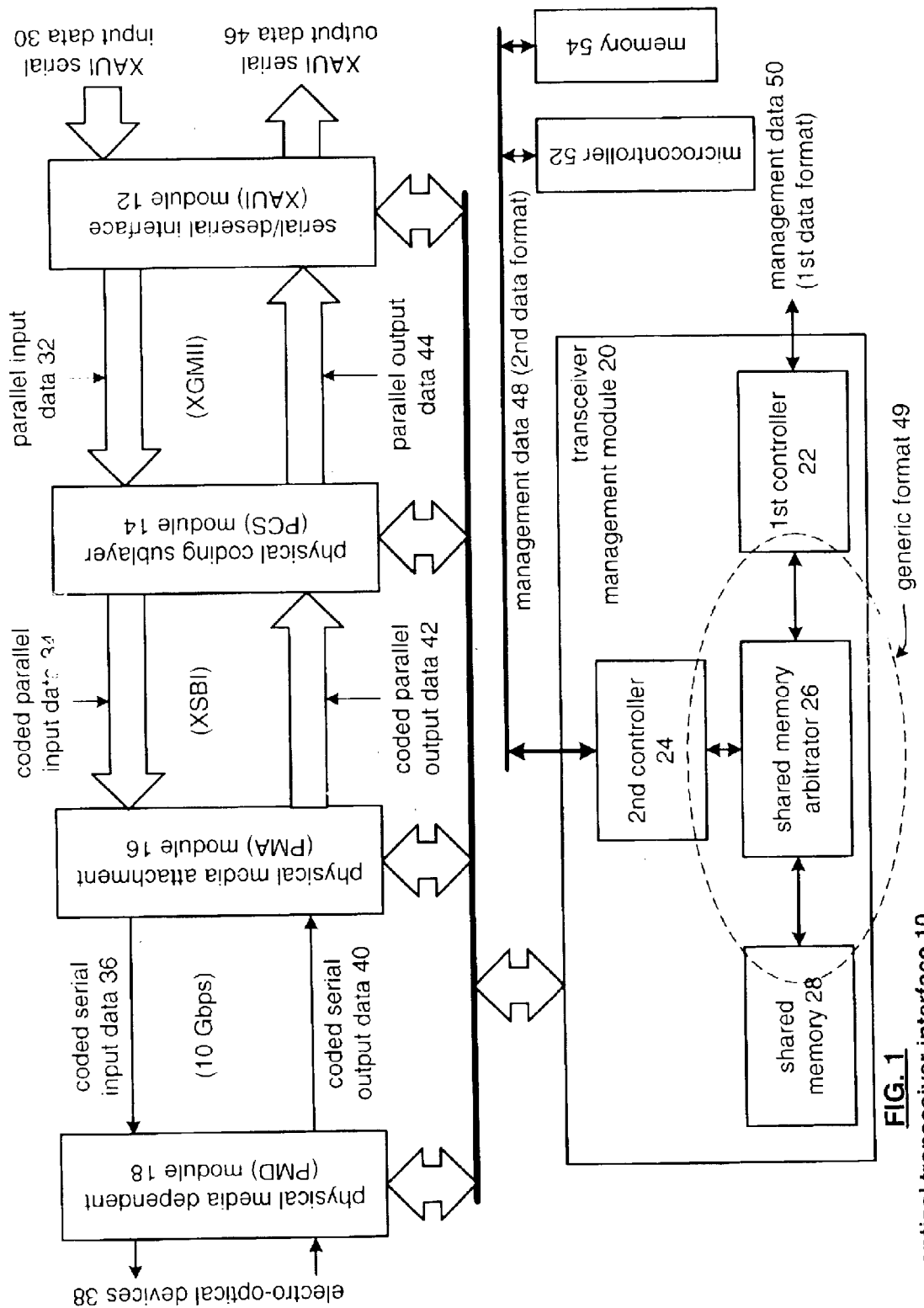
FIG. 1 is a schematic block diagram of an optical transceiver interface in accordance with the present invention.

FIG. 1 illustrates a schematic block diagram of an optical transceiver interface 10 that includes a serial/de-serial interface (XAUI) module 12, a physical coding sub-layer (PCS) module 14, a physical media attachment (PMA) module 16, a physical media dependent (PMD) module 18, a transceiver management module 20, a microcontroller 52 and memory 54. The transceiver management module 20 includes a $1^{st}$ controller 22, a $2^{nd}$ controller 24, a shared memory arbitrator 26 and shared memory 28. In general, the XAUI module 12, the PCS module 14, the PMA module 16 and the PMD module 18 comprise a data path for an optical transceiver and are constructed and hence operate in accordance with IEEE 802.3ae specification.

The data path is operably coupled to transceive serial data to and from electro-optical devices 38. Such an electro-optical device may be a light emitting diode (LED) and/or a group of LEDs. In particular, the XAUI module 12 is operably coupled to convert XAUI serial input data 30, which may be four parallel lines of 3.125 Gbps serial data, into parallel input data 32, which may be formatted in accordance with XGMII. In addition, the XAUI module 12 is operably coupled to convert parallel output data 44, which may be formatted in accordance with XGMII, into XAUI serial output data 46, which may include four parallel lines of 3.125 Gbps serial data.

The PCS module 14 is operably coupled to encode and decode parallel data. As shown, the PCS module 14 converts parallel input data 32, which may be formatted in accordance with XGMII, into coded parallel input data 34, which may be formatted in accordance with XSBI. In addition, the PCS module 14 converts coded parallel output data 42, which may be formatted in accordance with XSBI, into parallel output data 44, which may be formatted in accordance with XGMII.

The PMA module 46 converts the coded parallel input data 34, which may be formatted in accordance with XSBI, into coded serial input data 36, which may be formatted as 10.3125 Gbps serial data. In addition, the PMA module 32 converts coded serial output data 40, which may be formatted as 10.3125 Gbps serial data, into coded parallel output data 42, which may be formatted in accordance with XSBI.

The PMD module 18 provides the coded serial input data 36 to the electro-optical devices 38. In addition, the PMD module 18 receives serial data from the electro-optical devices 38 and provides them as coded serial output data 40 to the PMA module 16.

The management module 20 is operably coupled to manage the data path based on management data 48 and 50. In general, the management data may be diagnostic information, provisioning information, status information, and/or control data. In one embodiment, the management data is prescribed in the XENPAK specification. As illustrated, the management module 20 processes management data 48 via the second controller 24 and management data 50 via the first controller 22.

In general, the shared memory 28, which may be a random access dual port memory, stores the management data 48 and/or 50. At start up of the transceiver, the management data stored in memory 54, which may be a non-volatile memory such as an electronically erasable read only memory (EEPROM), is written into the shared memory 28. During the start up process, if a valid password is received from an external module via the first controller 22, the external module is given read and write access to the shared memory. If a valid password is not received during start up, the external module is only given read access to the shared memory 28. During operation of the optical transceiver, the microcontroller 52 may modify some or all of the management data based on the monitored operation of the optical transceiver. An external module given read and write access to the shared memory may also modify the management data during the operation of the optical transceiver. Otherwise, the external module may only read management data stored in the shared memory 28. As one of average skill in the art will appreciate, if the password is not provided at start-up it may be provided at any time during the operation of the transceiver interface 10, including, but not limited to, when an external device desired to write into the shared memory 28.

To facilitate the reading and writing of management data to and from the shared memory 28 by the microcontroller 52, which communicates the management data in a second data format (e.g., I$^2$C format), and to facilitate the reading and writing, or reading only, of management data to and from the shared memory 28 by an external module, which communicates the management data in a first data format (e.g., MDIO format), the management module 20 includes the first controller 22, the second controller 24, and the shared memory arbitrator 26. The $1_{st}$ controller 22 is operably coupled to receive management data 50 in a $1^{st}$ data format, which may be in accordance with the MDIO interface. The $1^{st}$ controller 22 converts the management data 50 between the $1^{st}$ data format and a generic data format 49. The generic formatted data 49 is provided to the shared memory arbitrator 26, which coordinates the storage of the generic formatted management data into the shared memory 28. The generic format is in accordance with reading and/or writing of a memory line of data to and/or from the shared memory 28. For example, if a memory line in the shared memory 28 is 8 bits in width, the generic format is an 8-bit data word that is read to or written from the shared memory 28 at the clock rate of the memory.

The $2^{nd}$ controller 24 transceives management data 48, in a $2^{nd}$ data format, with internal components such as microcontroller 52 and memory 54. The microcontroller 52 and memory 54 perform internal monitoring of the electro-optical devices 38. The $2^{nd}$ data format may be I$^2$C, which has been traditionally used for internal monitoring of optical transceivers. The $2^{nd}$ controller 24 converts the management data 48 from the $2^{nd}$ data format to the generic data format. The generic formatted data is provided to the shared memory arbitrator 26, which provides the generic data to shared memory 28.

The shared memory arbitrator 26 arbitrates access to the shared memory 28 between the $1^{st}$ and $2^{nd}$ controllers 22 and 24. The arbitration performed by the shared memory arbitrator will be described in greater detail with reference to FIG. 5.

The transceiver management module 20 is operably coupled to the XAUI module 12, PCS module 14, PMA module 16 and PMD module 18. The coupling between these devices may be in accordance with the $1^{st}$ data format or the $2^{nd}$ data format. In either case, the coupling between the transceiver management module 20 and modules 12–18 allow for the transceiving of management data between the modules and, as previously discussed, corresponds to diagnostics, provisioning, status and control of the optical transceiver.

Figure 2:
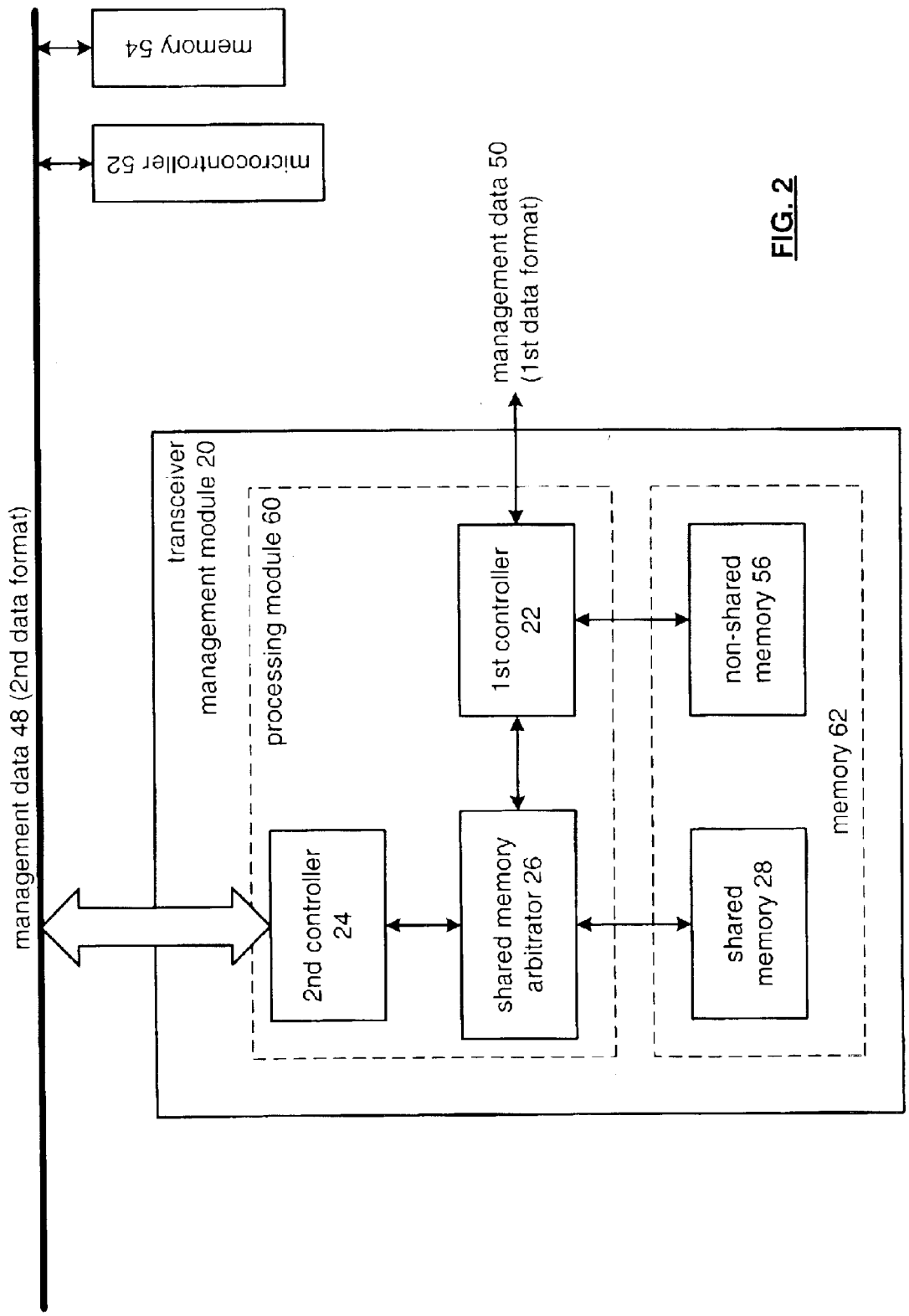
FIG. 2 is a schematic block diagram of a transceiver management module in accordance with the present invention.
Figure 3:
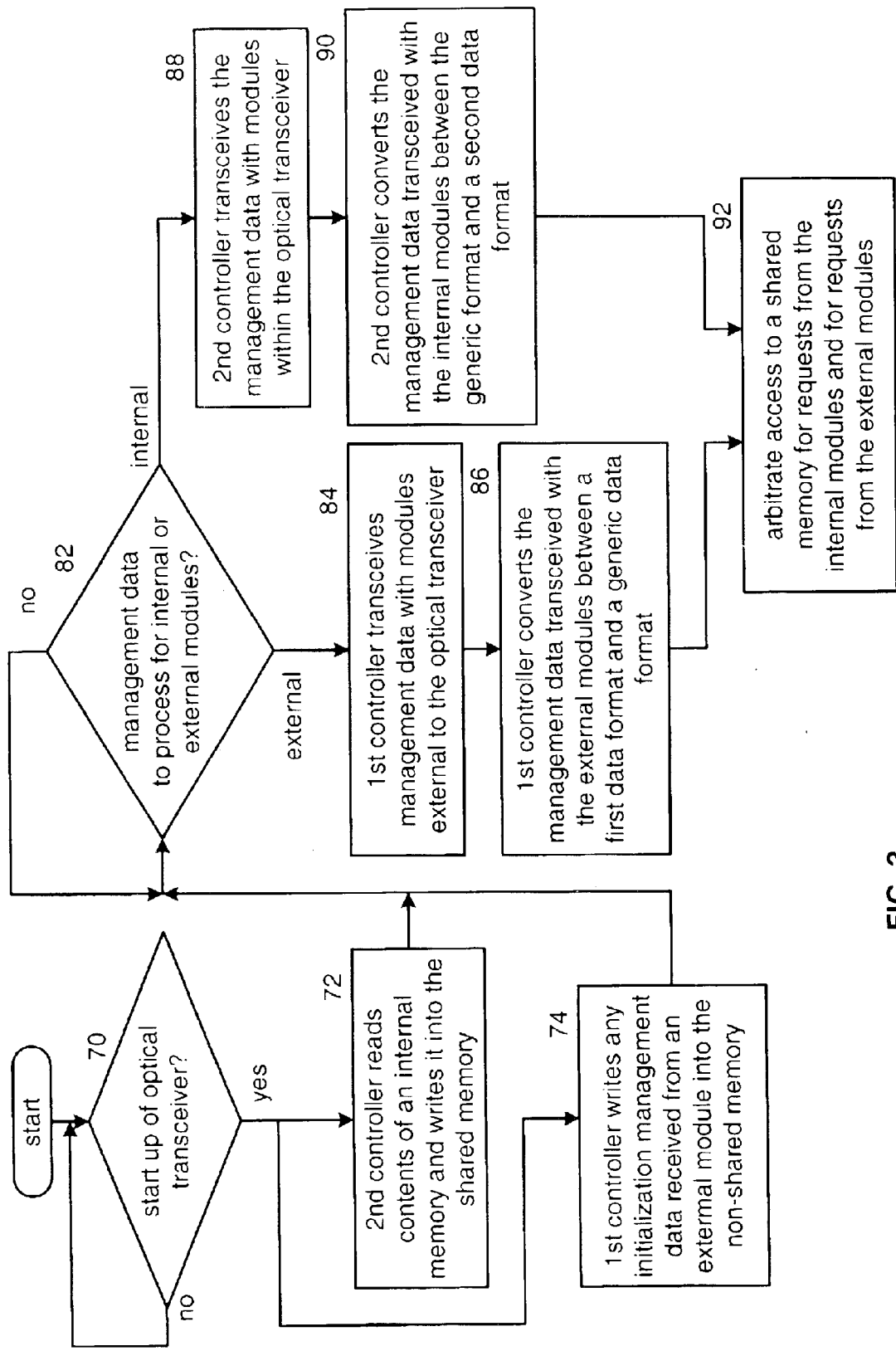
FIGS. 3–6 are a logic diagram of a method for management an optical transceiver in accordance with the present invention.

FIG. 2 illustrates a more detailed schematic block diagram of the transceiver management module 20. In this embodiment, the transceiver management module 20 includes a processing module 60 and memory 62. The processing module 60 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 62 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 60 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 62 stores, and the processing module 60 executes, operational instructions corresponding to at least some of the steps and/or functions illustrated in FIGS. 2–6.

The processing module 60 may be configured to provide the $2^{nd}$ controller 24, the $1^{st}$ controller 22 and the shared memory arbitrator 26. The memory 62 may be configured to include the shared memory 28 and a non-shared memory 56. The non-shared memory 56 is used via the $1^{st}$ controller 22 to store management data regarding the interface in the optical transceiver with an external device. For example, this non-shared memory may be storing vendor specific data.

FIGS. 3–6 illustrate a method for managing an optical transceiver in accordance with the present invention. The process begins at Step 70 where a determination is made as to whether the optical transceiver is starting up. If yes, the process proceeds to Steps 72 and 74. At step 72, the second controller of the transceiver management module reads the contents of an internal memory (e.g., memory 54) and then writes the contents into the shared memory 28. At Step 74, the first controller writes any initial management data it has received from external modules into the non-shared memory.

The first controller, on behalf of an external module, may write to the shared memory during start up if it writes a valid password into the password section of the shared memory. Once the password is validated, the first controller writes initialization management data on behalf of an external module into the shared memory.

As an example of the start up sequence, the $2^{nd}$ controller reads the contents of an external memory (i.e., non-volatile EEPROM memory 54) and stores the data in a random access memory (e.g., shared memory 28). The $1^{st}$ controller can then read any register as required or write the internal customer specific registers (i.e., the non-shared memory). Additionally, if the $1^{st}$ controller writes a value into MDIO addresses of OXFFFE and OXFFFF that matches the value stored in the EEPROM at MDIO address 0X80B1–0X80B4 (i.e., provides a valid password), then all internal RAM addresses of the shared memory are writeable. Once the information has been written into the shared RAM, the $1^{st}$ controller informs the $2^{nd}$ controller to write the contents of the shared RAM to the EEPROM. The addresses 0X08B1–0X08B4 are write-only RAM locations and will return a value of 0X0000. In this way, the password is hidden, but can be changed and stored in the external EEPROM. The vendor specific registers are protected with a check sum stored in 0X80BC At Step 82, a determination is made as to whether there is management data to process for internal or external modules. If management data is to be processed for external modules, the process proceeds to Step 84 where the first controller transceives the management data with modules external to the optical transceiver. The management data corresponds to information regarding the transceiving of electrical data via a data path of the optical transceiver. The process then proceeds to Step 86 where the management data transceived with the external modules is converted between a $1^{st}$ data format and a generic data format. The $1^{st}$ data format may be in accordance with a MDIO interface. The generic format may be in accordance with the reading and writing of data to and from a shared memory. The process then proceeds to step 92, which will be discussed below.

If management data is to processed for internal modules, the process proceeds to Step 88 where the second controller transceives management data with modules within the optical transceiver. The process then proceeds to Step 90 where the second controller converts the management data between the generic data format and a $2^{nd}$ data format. The $2^{nd}$ data format may correspond to a two-wire interface such as I²C.

The process then proceeds to Step 92 where access to a shared memory is arbitrated between requests from internal modules via the second controller and requests from external modules via the first controller. The process then repeats at Step 82 and remains in this loop until the optical transceiver is reset or restarted.

Figure 4:
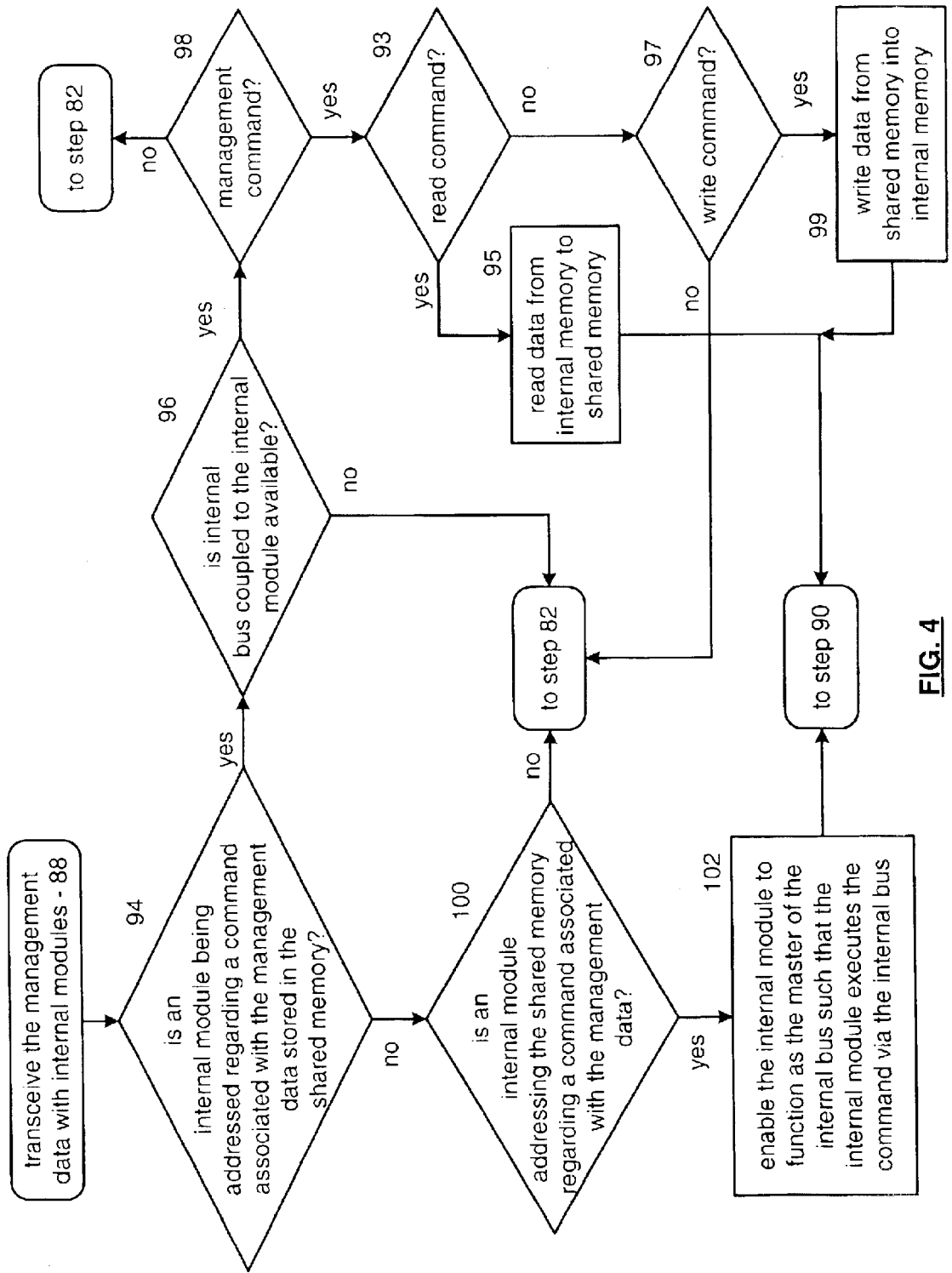

FIG. 4 further describes the processing of transceiving the management data with internal modules as described in Step 88 by the second controller. The process begins at Step 94 where a determination is made as to whether an internal module is being addressed regarding a command (e.g., a read request and/or a write request of management information) associated with the management data stored in the shared memory. If so, the process proceeds to Step 96 where another determination is made as to whether the internal bus coupled to the internal module (e.g., the microcontroller 52) is available. If not, the process reverts to Step 82, or an error message may be generated. If the bus is available, the process proceeds to Step 98 where a determination is made as to whether the command is a management command regarding management data. If not, the process reverts to Step 82.

If the command is a management command, the process proceeds to Step 93 where a determination is made as to whether the request is a read management data command. If so, the process proceeds to Step 95, where the second controller reads data from the internal memory into the shared memory. The process then reverts to Step 90. If the command is not a read command, the process proceeds to Step 97, where a determination is made as to whether the request is a write request. If not, the process reverts back to Step 82. If the command is a write request, the process proceeds to Step 99, where data is written from the shared memory into the internal memory by the second controller.

If, however, an internal module is not being addressed, the process proceeds to Step 100 where a determination is made as to whether an internal module (e.g., the microcontroller 52) is addressing the shared memory regarding a command associated with the management data. If not, the process reverts to Step 82. If yes, the process proceeds to Step 102. At Step 102, the internal module is enabled to function as the master of the internal bus and the second controller becomes a slave such that the internal module may execute the command via the internal bus. For example, the microcontroller 52 may have a command to write management data to shared memory 28. In this instance, the microcontroller 52 would become the master of the bus and the $2^{nd}$ controller 24 would become a slave. Once Step 102 has been completed, the process reverts to Step 90.

Figure 5:
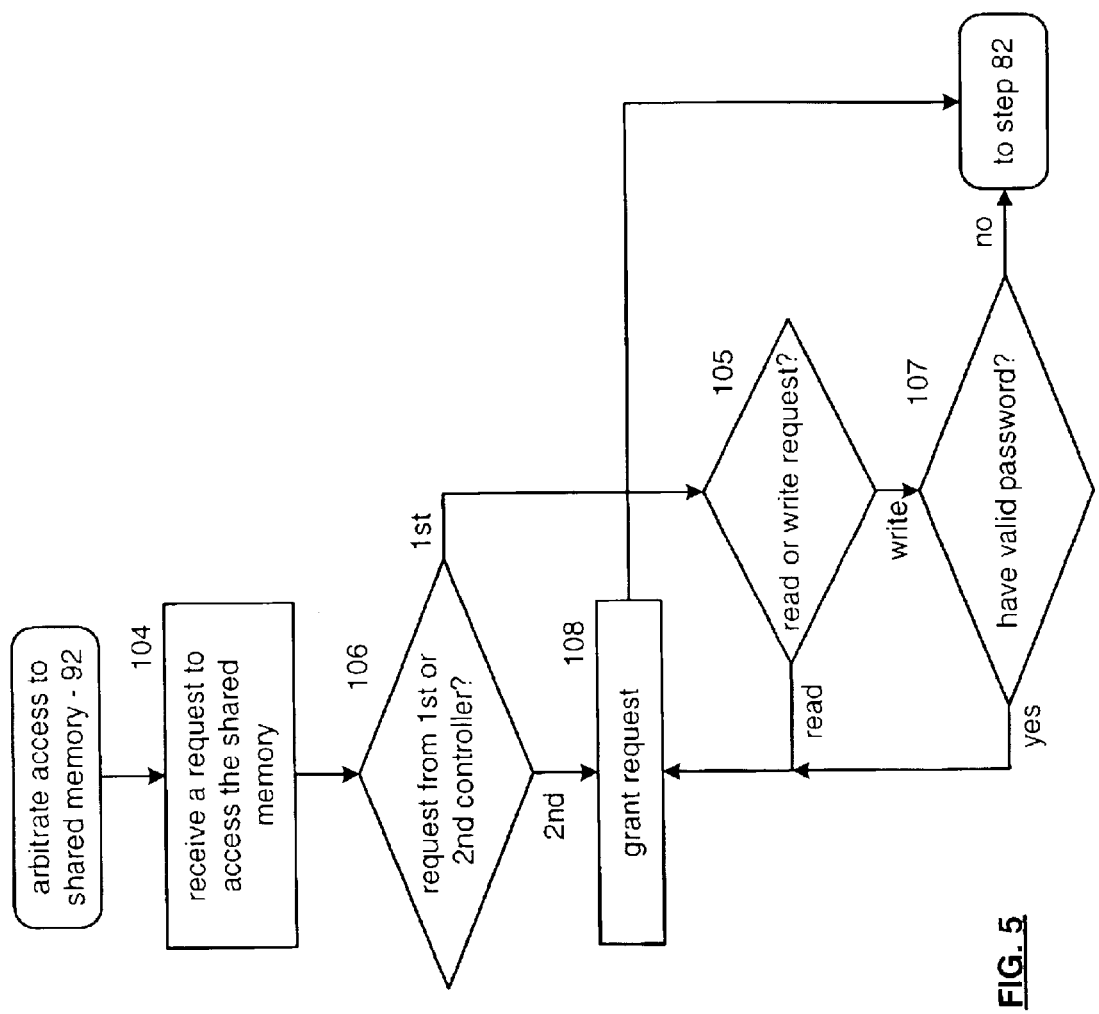

FIG. 5 further illustrates the arbitration access to the shared memory of Step 92. Such processing begins at Step 104 where a request (e.g., a read request or a write request) to access the shared memory is received. The process then proceeds to Step 106 where a determination is made as to whether the request was received from an external module via the $1^{st}$ controller or from an internal module via the $2^{nd}$ controller. If the request is received from the second controller, the process proceeds to step 108, where the request is granted and the process reverts to Step 82.

If the request is received from the first controller, the process proceeds to Step 105, where a determination is made as the whether the request is a read request or a write request. When the request is a read request, the process proceeds to Step 108, where the request is granted and the process reverts to Step 82. If the request is a write request, the process proceeds to Step 107, where a determination is made as to whether the first controller has provided a valid password as previously discussed. If not, the request is not processed and processing reverts to Step 82. If, however, a valid password as been provided, the process proceeds to Step 108, where the request is granted.

Steps 105, 106, 107 and 108 constitute an authentication process of a request. In general, to authenticate a request, the shared memory arbitrator determines the validity of the requestor and once the identify of the requestor has been verified, the shared memory arbitrator further determines whether this particular entity is allowed to make the particular request being requested. If not, the process reverts to Step 82 or a rejection message may be sent. If the request is authentic, the process proceeds to Step 108 where the request is executed. As one of average skill in the art will appreciate, the request may be automatically authenticated by the arbitration module receives if only authorized modules have access to the arbitration module.

Figure 6:
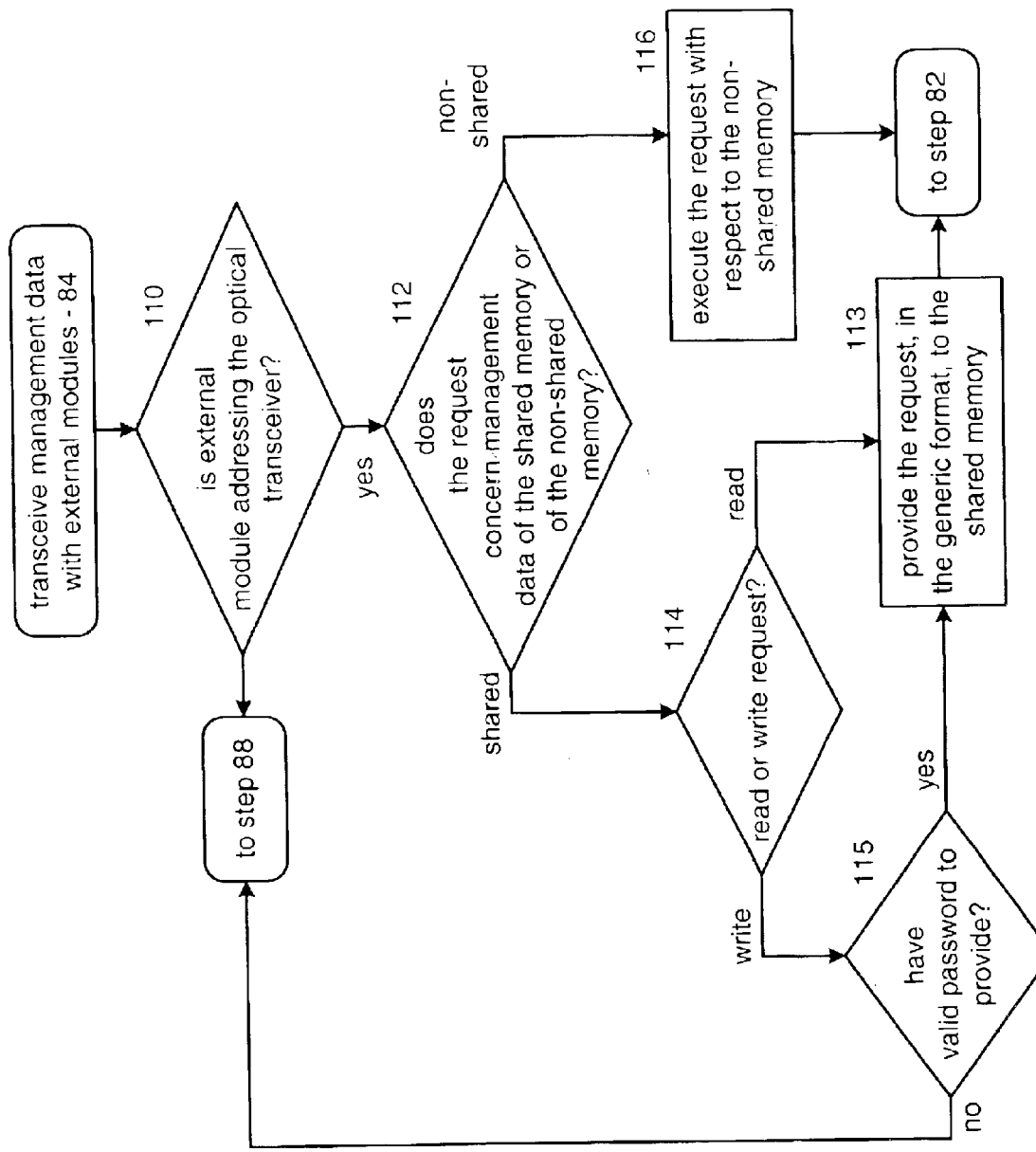

FIG. 6 illustrates the transceiving of management data with external modules as described in Step 84 in greater detail. The process begins at Step 110 where a determination is made as, to whether an external module is addressing the optical transceiver. If not, the process reverts to Step 88. If yes, the process proceeds to Step 112 where a determination is made as to whether the request concerns management data of the shared memory or management data of the non-shared memory. For management data concerning the shared memory, the process proceeds to Step 114. At Step 114, a determination is made as to whether the request is a read request or a write request. When the request is a read request, the process proceeds to Step 113, where the request is provided to the shared memory in a generic format. If the request is a write request, the process proceeds to Step 115 where a determination is made as to whether a valid password has been provided. If not, the process reverts to Step 88. If a valid password has been provided the process proceeds to Step 113, where the request is provided to the shared memory in a generic format and then the process reverts to Step 82.

If the request is concerning the non-shared memory, the process proceeds to Step 116 where the request is executed with respect to the non-shared memory and then the process reverts to Step 82. Accordingly, if the $1^{st}$ controller using the non-shared memory can process the particular request from an external module, it does so. If, however, the request concerns internal processing of the optical transceiver, the shared memory is accessed.

The preceding discussion has presented a method and apparatus for managing an optical transceiver. As one of average skill in the art will appreciate, other embodiments may be derived from the teachings of the present invention, without deviating from the scope of the claims.

What is claimed is:

1. An integrated physical layer module of an optical transceiver, the integrated physical layer module comprising:
    data path operably coupled to transceive electrical data with at least one optical transceiving device of the optical transceiver;
    management module operably coupled to manage the transceiving of the electrical data by the data path, the management module includes:
        first controller operably coupled to transceive management data external to the optical transceiver, wherein the first controller converts the management data between a first data format and a generic data format;
        second controller coupled to transceive the management data within the optical transceiver, wherein the second controller converts the management data between the generic data format and a second data format;
        shared memory operably coupled to store the management data in the generic data format; and
        shared memory arbitrator operably coupled to arbitrate access to the shared memory between the first and second controllers.

2. The integrated physical layer module of claim 1, wherein the management module furthers comprises:
    non-shared memory operably coupled to the first controller, wherein the non-shared memory stores management data regarding interfacing the optical transceiver with at least one external module.

3. The integrated physical layer module of claim 1 further comprises:
    the first controller operably coupled to transceive the management data eternal to the optical transceiver using a Management Data I/O interface (MDIO);
    the second controller operably coupled to transceive the management data within the optical transceiver using a two-wire interface; and
    the generic data format including a format corresponding to reading and writing data to and from the shared memory.

4. The integrated physical layer module of claim 1, wherein the second controller further functions to:
    determine whether an internal module of the optical transceiver is being addressed regarding a command associated with the management data stored in the shared memory;
    when the internal module of the optical transceiver is being addressed, determine whether an internal bus coupled to the internal module is available; and
    when the internal bus is available, enable the command.

5. The integrated physical layer module of claim 1, wherein the second controller further functions to:
    determine when an internal module of the optical transceiver is addressing the shared memory regarding a command associated with the management data;
    when the internal module of the optical transceiver is addressing the shared memory, switch to a slave mode; and
    enable the internal module to function as the master of an internal bus such that the internal module executes the command via the internal bus.

6. The integrated physical layer module of claim 1, wherein the shared memory arbitrator functions to:
    receive a request to access the shared memory via the first controller or the second controller;
    verify authenticity of the request with respect to the first or second controller; and
    when the request is authenticated, execute the request.

7. The integrated physical layer module of claim 1, wherein the first controller further functions to:
    determine when a request from an external module is addressed to the optical transceiver;
    when a request from an external module is addressed to the optical transceiver, determine whether the request concerns the management data of the shared memory or management data of a non-shared memory;
    when the request concerns the management data of the shared memory, provide the request, in the generic format, to the shared memory arbitrator; and
    when the request concerns the management data of the non-shared memory, execute the request with respect to the non-shared memory.

8. The integrated physical layer module of claim 1 further comprises:
    the second controller reading contents of an internal memory and writing the contents to the shared memory at start up of the optical transceiver;
    the shared memory arbitrator determining whether the first controller has written a valid password into a password section of the contents when a write to shared memory request is received from an external module via the first controller;
    when the first controller has written the valid password into the password section, the shared memory arbitrator enables the first controller to write initialization management data into the shared memory; and the second controller reads the initialization management data from the shared memory and writes the initialization management data to the internal memory.

9. The integrated physical layer module of claim 8 further comprises:

when the first controller has not written the valid password into the password section, the shared memory arbitrator rejects the write to shared memory request and enabling the first controller to have read-only access to the shared memory.

10. An optical transceiver interface comprising:

serial/deserial interface (XAUI) module operably coupled to convert XAUI serial inbound data into parallel inbound data and to convert parallel outbound data into XAUI serial outbound data;

physical coding sublayer (PCS) module operably coupled to perform sublayer encoding on the parallel inbound data to produce coded parallel inbound data and to perform sublayer decoding on coded parallel outbound data to produce the parallel outbound data;

physical media attachment (PMA) module operably coupled to convert the coded parallel inbound data into coded serial inbound data and to convert coded serial outbound data into the coded parallel outbound data;

physical media dependent (PMD) module operably coupled to provide the coded serial inbound data to an electro-optical device for light transmission and to receive the coded serial outbound data from a second electro-optical device; and transceiver management module operably coupled to provide management data to at least one of the XAUI module, the PCS module, the PMA module, and the PMD module, wherein the transceiver management module includes:

first controller operably coupled to transceive the management data external to the optical transceiver, wherein the first controller converts the management data between a first data format and a generic data format;

second controller coupled to transceive the management data within the optical transceiver, wherein the second controller converts the management data between the generic data format and a second data format;

shared memory operably coupled to store the management data in the generic data format; and shared memory arbitrator operably coupled to arbitrate access to the shared memory between the first and second controllers.

11. The optical transceiver interface of claim 10, wherein the transceiver management module furthers comprises:

non-shared memory operably coupled to the first controller, wherein the non-shared memory stores management data regarding interfacing the optical transceiver with at least one external device.

12. The optical transceiver interface of claim 10, wherein the transceiver management module furthers comprises:

the first controller operably coupled to transceive the management data eternal to the optical transceiver using a Management Data I/O interface (MDIO);

the second controller operably coupled to transceive the management data within the optical transceiver using a two-wire interface; and the generic data format including a format corresponding to reading and writing data to and from the shared memory.

13. The optical transceiver interface of claim 10, wherein the second controller further functions to:

determine whether an internal module of the optical transceiver is being addressed regarding a command associated with the management data stored in the shared memory;

when the internal module of the optical transceiver is being addressed, determine whether an internal bus coupled to the internal module is available; and when the internal bus is available, enable the command.

14. The optical transceiver interface of claim 10, wherein the second controller further functions to:

determine when an internal module of the optical transceiver is addressing the shared memory regarding a command associated with the management data;

when the internal module of the optical transceiver is addressing the shared memory, switch to a slave mode; and enable the internal module to function as the master of an internal bus such that the internal module executes the command via the internal bus.

15. The optical transceiver interface of claim 10, wherein the shared memory arbitrator functions to:

receive a request to access the shared memory via the first controller or the second controller;

verify authenticity of the request with respect to the first or second controller; and when the request is authenticated, execute the request.

16. The optical transceiver interface of claim 10, wherein the first controller further functions to:

determine when a request from an external module is addressed to the optical transceiver;

when a request from an external module is addressed to the optical transceiver, determine whether the request concerns the management data of the shared memory or management data of a non-shared memory;

when the request concerns the management data of the shared memory, provide the request, in the generic format, to the shared memory arbitrator; and when the request concerns the management data of the non-shared memory, execute the request with respect to the non-shared memory.

17. The optical transceiver interface of claim 10 further comprises: the second controller reading contents of an internal memory and writing the contents to the shared memory at start up of the optical transceiver;

the shared memory arbitrator determining whether the first controller has written a valid password into a password section of the contents when a write to shared memory request is received from an external module via the first controller;

when the first controller has written the valid password into the password section, the shared memory arbitrator enables the first controller to write initialization management data into the shared memory; and the second controller reads the initialization management data from the shared memory and writes the initialization management data to the internal memory.

18. The optical transceiver interface of claim 17 further comprises:

when the first controller has not written the valid password into the password section, the shared memory arbitrator rejects the write to shared memory request and enabling the first controller to have read-only access to the shared memory.

19. A method for managing an optical transceiver, the method comprising:

transceiving management data with modules external to the optical transceiver, wherein the management data manages transceiving of the electrical data by a data path of the optical transceiver;

converting the management data transceived with the external modules between a first data format and a generic data format;

transceiving the management data with modules within the optical transceiver;

converting the management data transceived with the internal modules between the generic data format and a second data format; and arbitrating access to a shared memory for requests from the internal modules and for requests from the external modules.

20. The method of claim 19 furthers comprises:

storing management data regarding interfacing the optical transceiver with at least one external device in non-shared memory.

21. The method of claim 19 further comprises:

transceiving the management data with the eternal modules using a Management Data I/O interface (MDIO);

transceiving the management data with the internal modules using a two-wire interface; and generically formatting the management data to correspond to reading and writing data to and from the shared memory.

22. The method of claim 19, wherein the transceiving the management data with the internal modules further comprises:

determining whether the internal module is being addressed regarding a command associated with the management data stored in the shared memory;

when the internal module is being addressed, determining whether an internal bus coupled to the internal module is available; and when the internal bus is available, enabling the command.

23. The method of claim 19, wherein the transceiving the management data with the internal modules further comprises:

determining when the internal module is addressing the shared memory regarding a command associated with the management data;

when the internal module is addressing the shared memory, enabling the internal module to function as the master of an internal bus such that the internal module executes the command via the internal bus.

24. The method of claim 19, wherein the arbitrating further comprises:

receiving a request to access the shared memory;

verifying authenticity of the request; and when the request is authenticated, executing the request.

25. The method of claim 19, wherein the transceiving the management data with the external module further comprises:

determining when a request from the external module is addressed to the optical transceiver;

when a request from the external module is addressed to the optical transceiver, determining whether the request concerns the management data of the shared memory or management data of a non-shared memory;

when the request concerns the management data of the shared memory, providing the request, in the generic format, to the shared memory; and when the request concerns the management data of the non-shared memory, executing the request with respect to the non-shared memory.

26. The method of claim 19 further comprises:

reading contents of an internal memory and writing the contents to the shared memory at start up of the optical transceiver;

determining whether a valid password is written into a password section of the contents when a write to shared memory request from an external module is received;

when the valid password is written into the password section, enabling writing initialization management data into the shared memory by the external module; and reading the initialization management data from the shared memory and writing the initialization management data to the internal memory.

27. The method of claim 26 further comprises:

when the valid password has not been written into the password section, denying the write to shared memory request and enabling read only access to the shared memory for the external module.

28. An apparatus for managing an optical transceiver, the apparatus comprising:

processing module; and memory operably coupled to the processing module, wherein the memory stores operational instructions that cause the processing module to:

transceive management data with modules external to the optical transceiver, wherein the management data manages transceiving of the electrical data by a data path of the optical transceiver;

convert the management data transceived with the external modules between a first data format and a generic data format;

transceive the management data with modules within the optical transceiver;

convert the management data transceived with the internal modules between the generic data format and a second data format; and arbitrate access to a shared memory for requests from the internal modules and for requests from the external modules.

29. The apparatus of claim 28, wherein the memory furthers comprises operational instructions that cause the processing module to:

store management data regarding interfacing the optical transceiver with at least one external device in non-shared memory.

30. The apparatus of claim 28, wherein the memory furthers comprises operational instructions that cause the processing module to:

transceive the management data with the eternal modules using a Management Data I/O interface (MDIO);

transceive the management data with the internal modules using a two-wire interface; and generically format the management data to correspond to reading and writing data to and from the shared memory.

31. The apparatus of claim 28, wherein the memory furthers comprises operational instructions that cause the processing module to transceive the management data with the internal modules by:

determining whether the internal module is being addressed regarding a command associated with the management data stored in the shared memory;

when the internal module is being addressed, determining whether an internal bus coupled to the internal module is available; and when the internal bus is available, enabling the command.

32. The apparatus of claim 28, wherein the memory furthers comprises operational instructions that cause the processing module to transceive the management data with the internal modules by:

determining when the internal module is addressing the shared memory regarding a command associated with the management data;

when the internal module is addressing the shared memory, enabling the internal module to function as the master of an internal bus such that the internal module executes the command via the internal bus.

33. The apparatus of claim 28, wherein the memory furthers comprises operational instructions that cause the processing module to arbitrate access to the shared memory by:

receiving a request to access the shared memory;

verifying authenticity of the request; and when the request is authenticated, executing the request.

34. The apparatus of claim 28, wherein the memory furthers comprises operational instructions that cause the processing module to transceive the management data with the external module by:

determining when a request from the external module is addressed to the optical transceiver;

when a request from the external module is addressed to the optical transceiver, determining whether the request concerns the management data of the shared memory or management data of a non-shared memory;

when the request concerns the management data of the shared memory, providing the request, in the generic format, to the shared memory; and when the request concerns the management data of the non-shared memory, executing the request with respect to the non-shared memory.

35. The apparatus of claim 28, wherein the memory furthers comprises operational instructions that cause the processing module to, at start up of the optical transceiver:

read contents of an internal memory and writing the contents to the shared memory at start up of the optical transceiver;

determine whether a valid password is written into a password section of the contents when a write to shared memory request from an external module is received;

when the valid password is written into the password section, enable writing initialization management data into the shared memory by the external module; and read the initialization management data from the shared memory and writing the initialization management data to the internal memory.

36. The apparatus of claim 35, wherein the memory furthers comprises operational instructions that cause the processing module to:

when the valid password has not been written into the password section, deny the write to shared memory request and enable read only access to the shared memory for the external module.

\* \* \* \* \*